(12) United States Patent
Hull et al.

(10) Patent No.: US 10,310,071 B1
(45) Date of Patent: Jun. 4, 2019

(54) STANDOFF GEOPHYSICAL ANOMALY DETECTION SYSTEM AND METHOD

(75) Inventors: David Mark Hull, Adelphi, MD (US); Gregory Alton Holifield, Eustis, TX (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 3364 days.

(21) Appl. No.: 11/999,033

(22) Filed: Sep. 16, 2008

Related U.S. Application Data

(60) Provisional application No. 60/972,857, filed on Sep. 17, 2007.

(51) Int. Cl.
*G01S 13/88* (2006.01)

(52) U.S. Cl.
CPC ................... *G01S 13/885* (2013.01)

(58) Field of Classification Search
CPC .... F41H 11/136; G01S 13/885; G01S 13/888; G01S 13/887; G01V 3/12
USPC ......................................................... 342/28
See application file for complete search history.

(56) References Cited

U.S. PATENT DOCUMENTS

| | | | |
|---|---|---|---|
| 5,640,092 A * | 6/1997 | Motazed | G01V 3/104 324/247 |
| 6,037,784 A | 3/2000 | Smith | |
| 6,351,128 B1 | 2/2002 | Johnston | |
| 6,404,203 B1 | 6/2002 | Lagmanson | |
| 6,674,286 B2 | 1/2004 | Lagmanson | |
| 7,183,777 B2 | 2/2007 | Bristow et al. | |
| 7,215,430 B2 | 5/2007 | Kacyra et al. | |
| 7,223,983 B2 | 5/2007 | Kawasaki et al. | |
| 7,586,433 B1 * | 9/2009 | Johansson | G01S 7/295 342/22 |
| 2006/0055418 A1 | 3/2006 | Ogilvy et al. | |
| 2006/0186889 A1 * | 8/2006 | Andreis | G01V 3/083 324/345 |
| 2007/0265782 A1 * | 11/2007 | Kleinberg | G01V 1/288 702/6 |

(Continued)

OTHER PUBLICATIONS

AGI SuperSting R1 IP Single Channel Memory Earth Resistivity and IP Meter, AGI Advanced Geosciences, Inc., Austin, Texas, Aug. 25, 2008, http://www.agiusa.com/supersting-r1.shtml. [Admitted Prior Art].

(Continued)

*Primary Examiner* — Timothy A Brainard
(74) *Attorney, Agent, or Firm* — Lawrence E. Anderson; Eric Brett Compton

(57) ABSTRACT

A system and method for measuring the complex resistivity of a ground section. One embodiment utilizes stand-off capacity-coupled resistivity (CCR) sensing to inject current into the ground at a frequency within the range of 1 Khz to 1 MHz. A sensor detects the voltage which is used to determine the complex resistively of the ground and, thus, ground content. The system and method permits surveys to be conducted at speeds of 10-20 mph or more. Alternatively, current is injected into the ground along a plasma channel that is enabled with a high energy laser. Alternatively, an alpha particle generator may be used to inject the current. Multiple frequencies may be used within the range of 1 KHz to 1 MHz to produce an impedivity spectroscopy to thereby determine and/or display a map of ground content.

19 Claims, 17 Drawing Sheets

(56) References Cited

U.S. PATENT DOCUMENTS

2008/0215260 A1    9/2008  Kobaru
2008/0290874 A1*  11/2008  Seleznev .................. G01V 3/12
                                                        324/337

OTHER PUBLICATIONS

AGI SuperSting R8 IP Eight Channel Memory Earth Resistivity and IP Meter, AGI Advanced Geosciences, Inc., Austin, Texas, Aug. 27, 2007, http://www.agiusa.com/supersting.shtml.

Farias, "Fractal Complex Resistivity Image for Environmental Application," 2004 IEEE Workshop on Machine Learning for Signal Processing, 2004, IEEE, pp. 775-783.

OhmMapper product literature, OYO Corporation, Geometrics Group, Inc. Http://www.geometrics.com/OhmMapper/Ohmmap.html. Printed from website dated Mar. 4, 2005.

Geophex GEM-2 and GEM-3 product literature, by Geophex Ltd., Raleigh, North Carolina, Http://wwww.geophex.com/GEM-2/FLyer/GEM2%20flyer2jpg.jpg. Printed from websites dated Oct.-Dec. 2004 and Sep. 2007. [Admitted Prior Art].

Stolar Research, Raton, New Mexico, DeltaEM gradiometer, http://www.stolarhorizon.com/DELTA_EM.htm Web page dated Dec. 9, 2004 and DeltaEM Gradiometer brochure (c) 2008[Admitted Prior Art].

MC Miller Co. web site dated Sep. 12, 2007, Nilsson Model 400 Soil Resistibity Test Kit. http://web.archive.org/web/2007091231323/http://www.mcmiller.com/Nilsson_400_meter.asp.

MC Miller Co. web site dated Dec. 17, 2006 Four-Pin Test Set & Soil Pins http://web.archive.org/web/20061217024930/http://www.mcmiller.com/4Pin.asp.

MC Miller Co. web site dated Sep. 17, 2008; Miller 400A Resistance Meter with User Manual; http://www.mcmiller.com.

L.G. Stolarczyk, et al., "Radio Imaging Method (RIM) of Diagnostice Imaging of Anomalous Geologic Structures in Coal Seam Waveguides," Society for Mining, Metallurgy, and Exploration, Transactions, Mining Engineering, vol. 288, pp. 1806-1815 (Aug. 1991).

L.G. Stolarczyk, et al., "Electromagnetic Wave Detector and Imaging Technologies (EDIT) for REducing Ash, Sulfur, and Heavy Metals in Run-of-Mine Coal," Fifteenth Annual International Pittsburgh Coal Conference Proceedings, (Sep. 14-18, 1998) pp. 1-25.

Ramirez, "Complex Resistivity Tomography for Environmental Applications," 1st World Congress on Industrial Process Tomography, Buxton, Greater Manchester, Apr. 14-17, 1999, pp. 14-19.

A. Kemna, et al., "Complex resistivity tomography for environmental applications," Chemical Engineering Journal vol. 77, Issues 1-2, Apr. 15, 2000, Abstract Only.

Kuras, "The Capacitive Resistivity Technique for Electrical Imaging of the Shallow Surface," Thesis submitted to University of Nottingham for the Degree of Doctor of Philosophy, Dec. 2002.

* cited by examiner

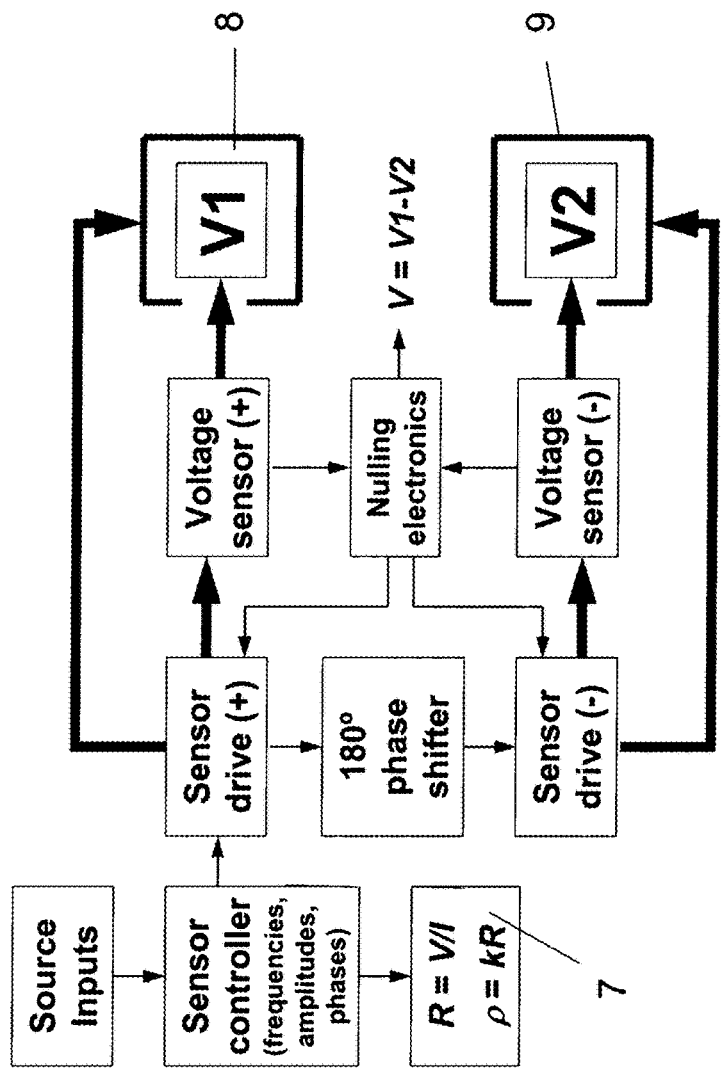

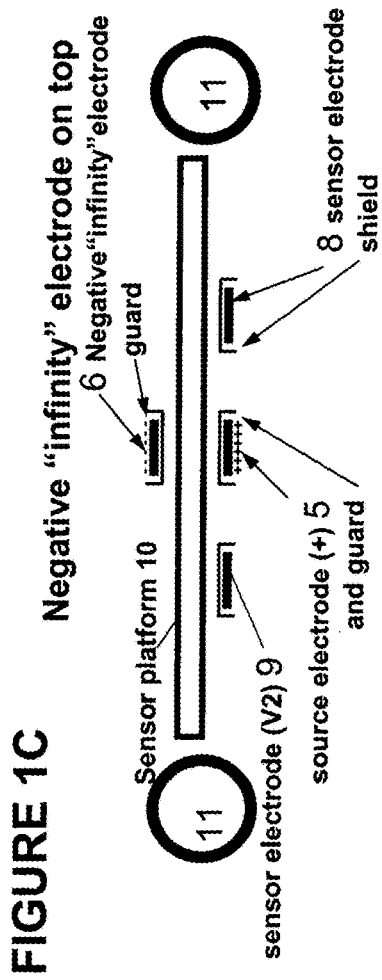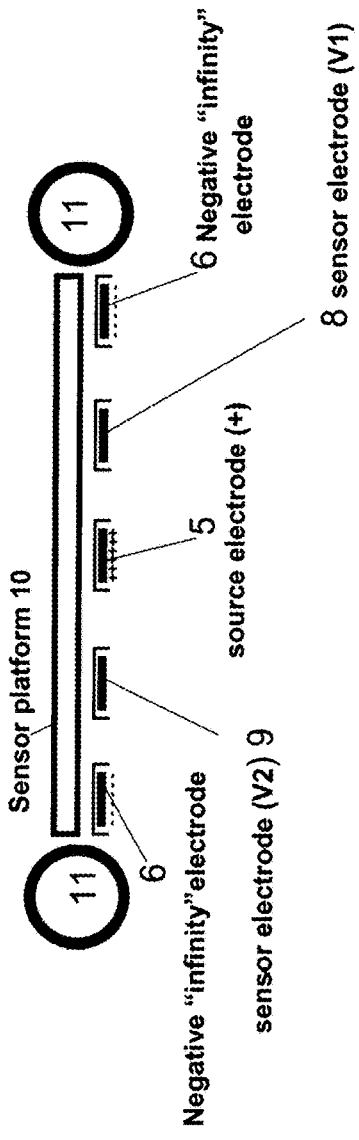
FIGURE 1C Negative "infinity" electrode on top
FIGURE 1D Split "infinity" electrode on bottom

FIGURE 1E source electrodes
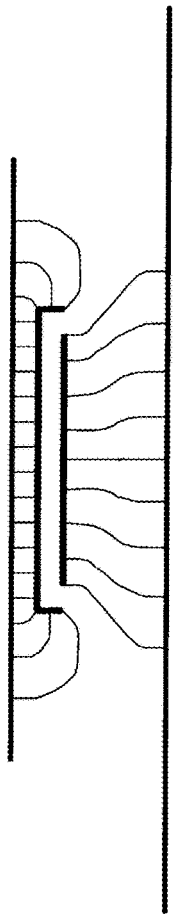
- Guard is at the same potential as the source
- Guard embodies all stray capacitance
- All source capacitance is to ground
- Monitor source current (to ground)
- $i = dQ/dt = 2\pi fCV \sim 2\pi f \varepsilon AV/d \sim 20\ mA$, if...
  $f = 1\ MHz$, $A = 0.1\ m^2$ (1'x1'), $V = 1\ kV$, $d = 0.3\ m$ (1 ft)
NO first-order effects due to platform bounce

FIGURE 1F sensor electrodes

- Sensor is driven as a voltage-follower
  - No measured E-field (to ground)
  - Feedback voltage is sensed potential
  - Feedback loop compensates for vehicle bounce (0.1 Hz – 100 Hz)
  - No feedback in passband (1 kHz – 1 MHz)
- Shield is at the same potential as the sensor
  - Embodies all platform capacitance
  - Eliminates crosstalk to other electrodes NO first-order response to platform bounce

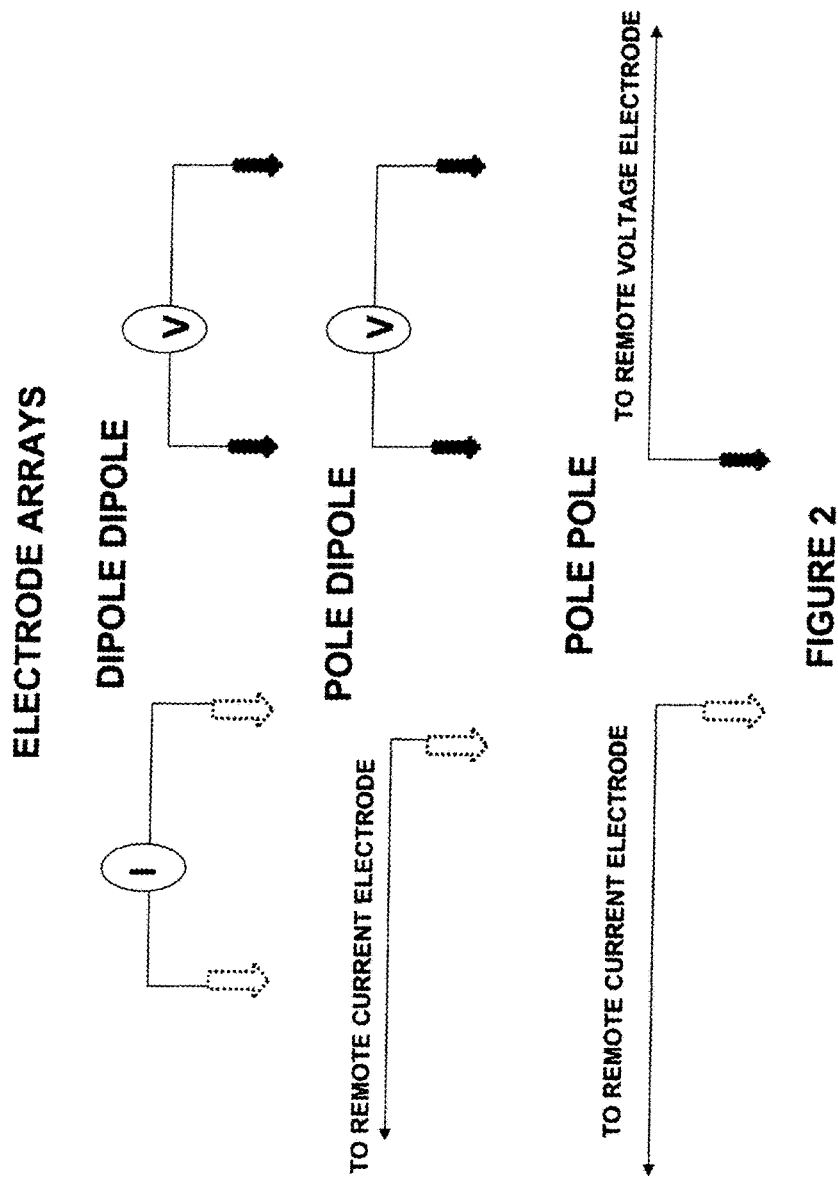

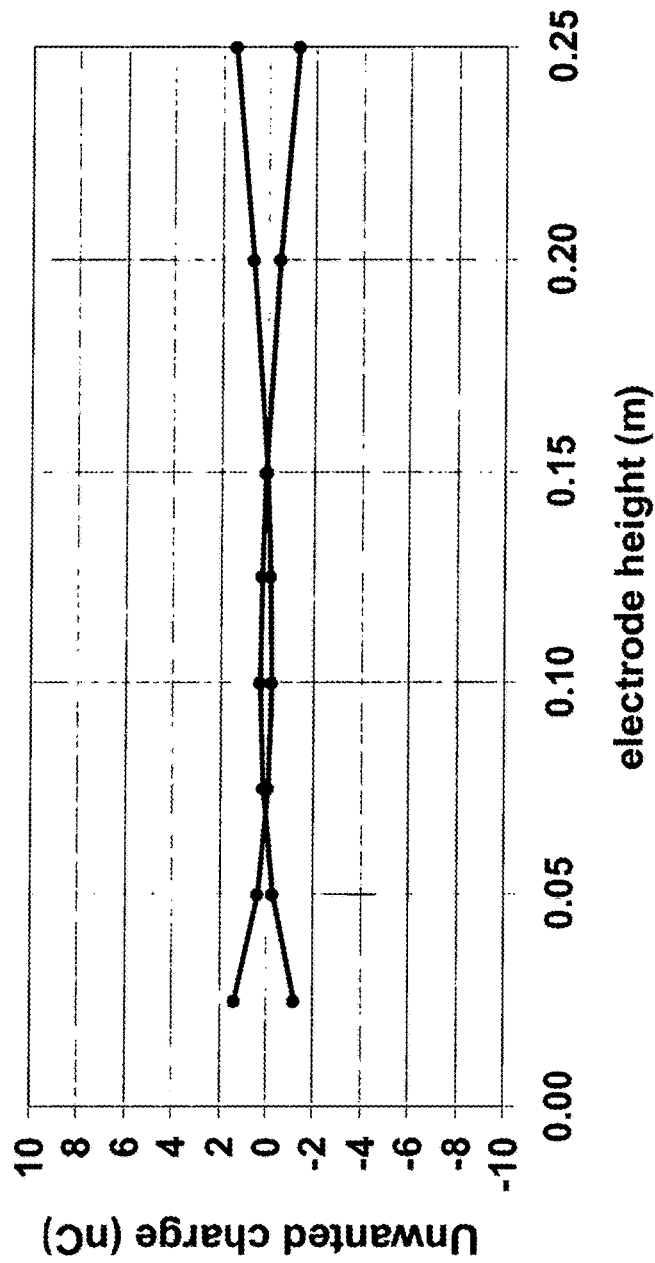
FIGURE 8 Electrode simulations
Want good ground coupling; insensitivity to platform bounce

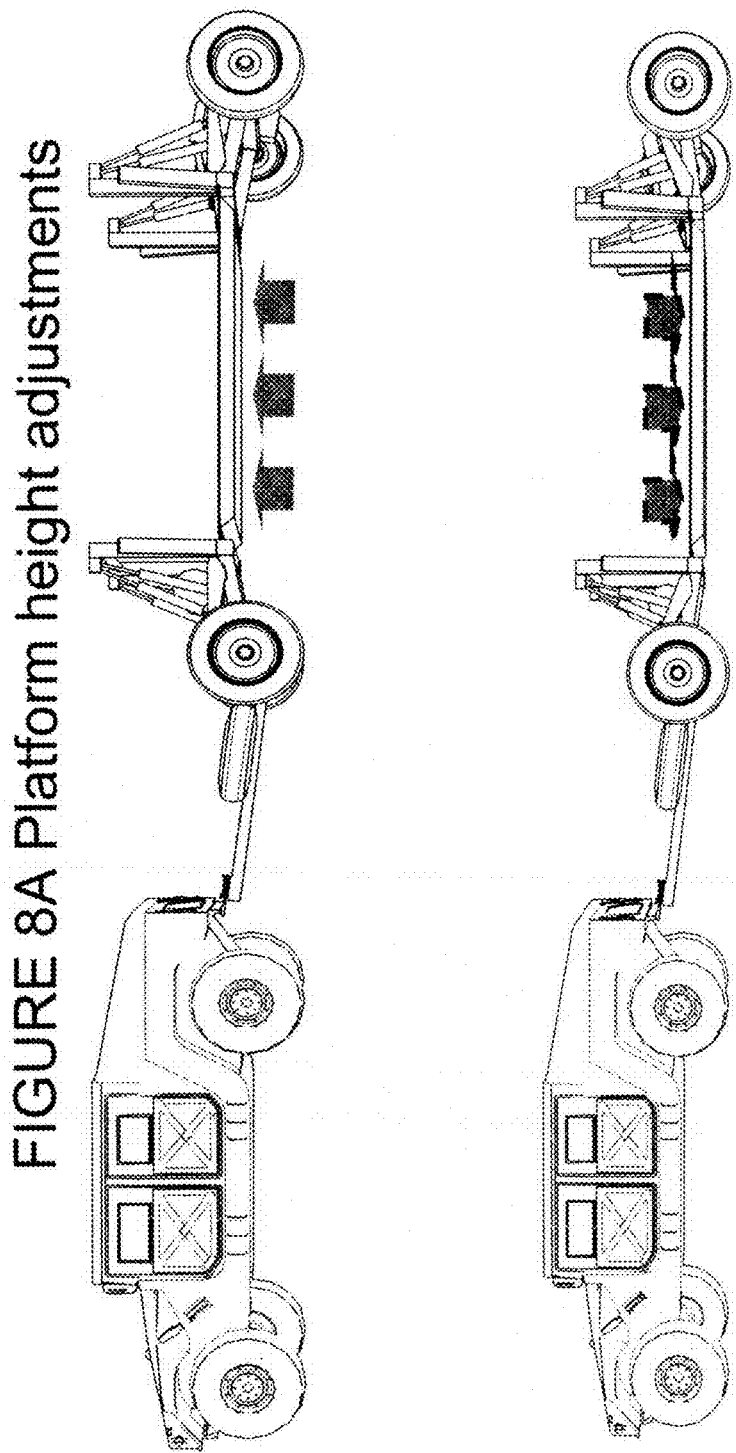

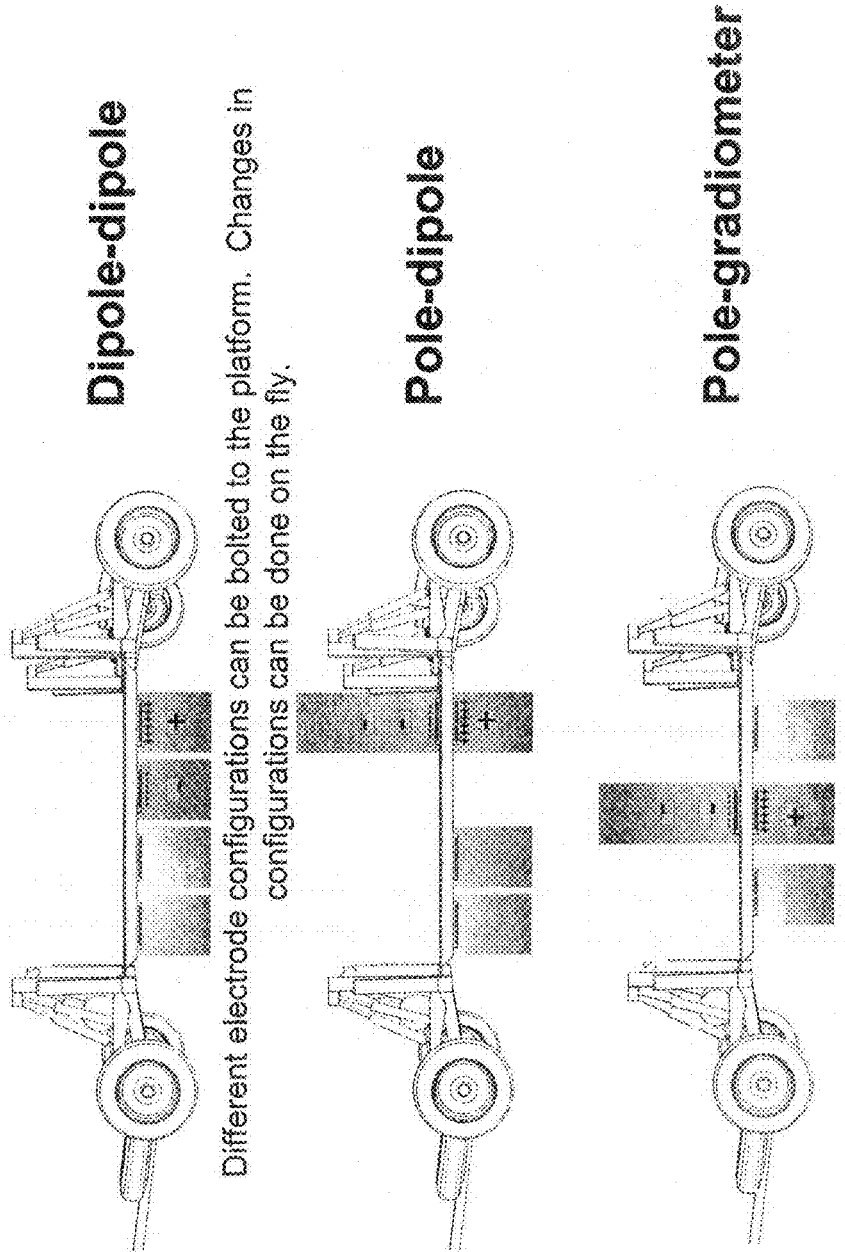

FIGURE 10 "Static" and "EM" fields

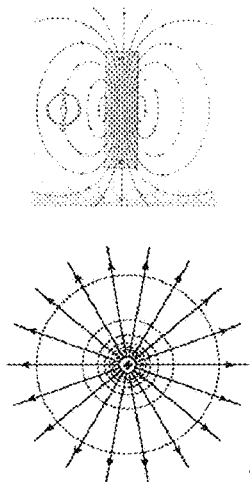
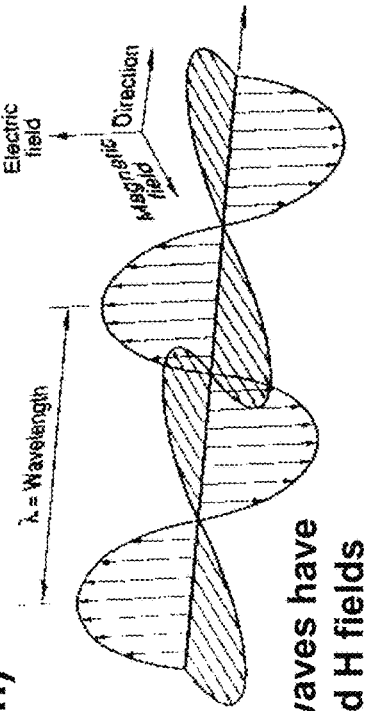

Near (quasi-static) zone:
$d \approx r \ll \lambda$ where $d$ ~ source dimensions
$r$ ~ range (source to sensor)
$\lambda$ = wavelength = $c/f$ quasi-static E and H fields can exist together, but are independent of each other

Intermediate (induction) zone:
$d \ll r \approx \lambda$

Far (radiation) zone:
$d \ll \lambda \ll r$ transmitted waves have coupled E and H fields

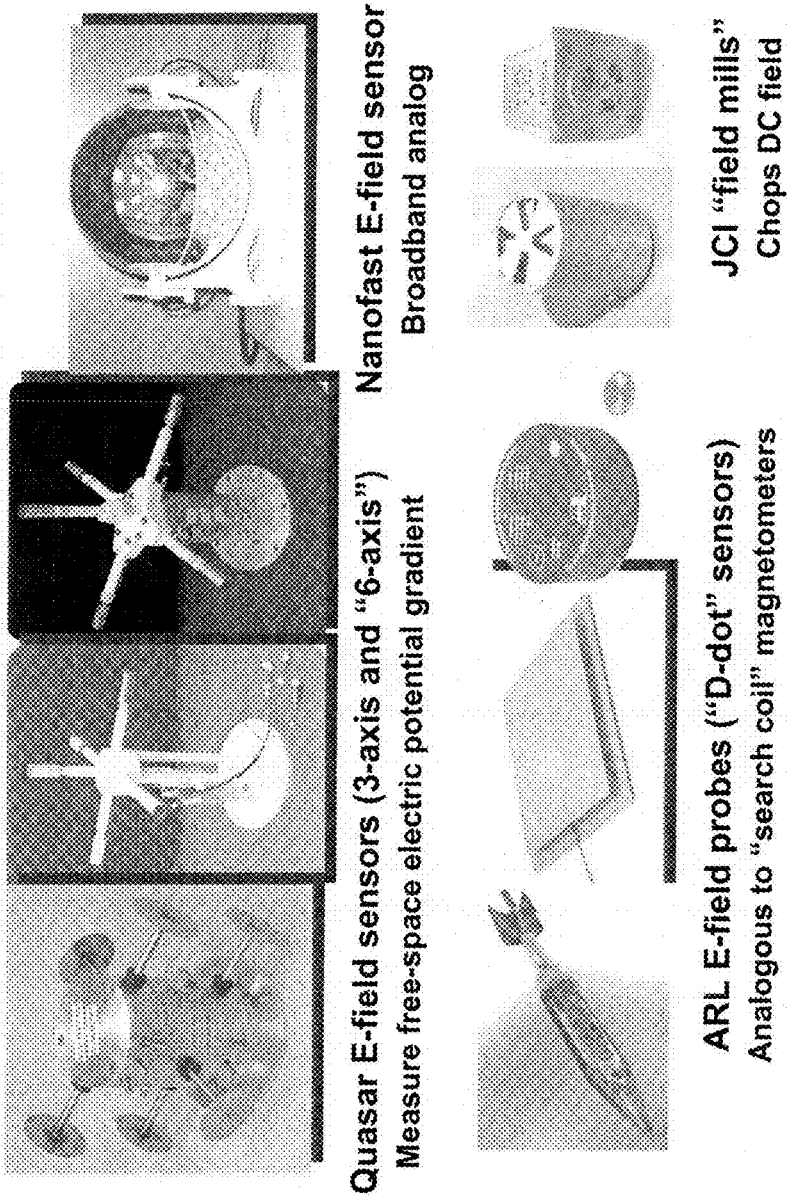
FIGURE 11 Quasi-static E-field sensors

STANDOFF GEOPHYSICAL ANOMALY DETECTION SYSTEM AND METHOD

RELATED APPLICATIONS

This application claims priority to U.S. Provisional Application No. 60/972,857 filed on Sep. 17, 2007.

GOVERNMENT INTEREST

The invention described herein may be manufactured, used, and licensed by or for the United States Government.

BACKGROUND OF THE INVENTION

Technical Field

The present disclosure relates generally to geophysical exploration, and more particularly, to underground anomaly sensing and detection.

Description of Related Art

Several companies manufacture instrumentation-grade E-field sensors and/or other sensors that are commonly used in commercial geophysical exploration. These geophysical sensors are used to classify and localize water, minerals, fractures in rock, buried anomalies (UXO, pipes, wires, etc.), voids (caves, tunnels, sinkholes, etc.), underground structures, and for many other similar purposes. Obviously, these kinds of sensors also have many similar military applications.

The AGI SuperSting™, made by AGI Advanced Geosciences, Inc. of Austin Tex., can measure the apparent resistivity of ground, that is, a "weighted average" of the resistivity of the ground in the vicinity of the conducting electrodes. More precisely, the apparent resistivity measurements are given by magnitude of the measured voltage (V) at one set of electrodes relative to an applied current (I) at another set of electrodes (apparent resistivity R=K*V/I, where K is a geometric factor that is a function of the positions of the electrodes). The apparent resistivities measured by the AGI SuperSting are the "real" components of the apparent resistivities (near DC). A set of these apparent resistivities can be inverted to give a "real" resistivity image. For a more extensive discussion see, e.g. Telford et al, "Applied Geophysics", 2nd Edition, Cambridge University Press, 1990.

The AGI SuperSting™ can also measure the induced polarization (IP). This measurement is independent of the resistivity measurements, and is related to the charge relaxation time constant (or the frequency at which dielectric effects become significant). The time constant is measured in milliseconds. Thus, it is a crude estimate of the imaginary component of the apparent resistivity between DC and 1 kHz. These apparent IP measurements can also be inverted, but since the measured units are time (not resistivity), the inverted image is not really the imaginary component of resistivity but something closer to a "quasi-conducting frequency." See Kraus, Electromagnetic, $4^{th}$ Edition, McGraw-Hill, 1992, and especially §§ 12-14 ("Conductors and Dielectrics"). This technique is also described in more detail in the Telford publication mentioned above.

In U.S. Pat. No. 7,215,430 ('430 patent), to Lagmanson, entitled "Methods and Apparatus for Measuring Electrical Properties of a Ground Using and Electrode Configurable as a Transmitter of Receiver," hereby incorporated by reference, discloses a method for measuring an electrical property of the ground by utilizing a polarizable electrode for transmitting a current into the ground and a nonpolarizable electrode for measuring a potential associated with that current. The '430 patent utilizes metal stakes for current (source) electrodes and metal/metal salt (such as silver chloride) electrodes for the voltage (sensor) electrodes. See Col. 1, lines 45-50 & Col. 5, lines 50-64. The '430 patent further discloses software configured to render a map of the ground from the electrical potential recorded by the resistivity meter. See Col. 3, lines 1-5. The '430 patent further discloses that the electrode may be within a Wenner alpha array, a Wenner beta array, a Wenner gamma array, a pole-pole array, a dipole-dipole array, a pole-dipole array, a Wenner array, a Schlumberger array, an equatorial dipole-dipole array, or any combination thereof. See Col. 3, lines 3-8.

U.S. Pat. No. 6,674,286 (286 patent) entitled "Methods and Apparatus for Measuring Electrical Properties of a Ground Using a Graphic Electrode," to Lagmanson, discloses methods and apparatus for measuring an electrical property of the ground utilizing a graphite electrode for transmitting a current in to the ground and for measuring the potential associated with the current. The '286 patent is hereby incorporated by reference. According to the '286 patent, resistivity measurements are made by applying current directly into the ground using a pair of transmitting electrodes. Resulting potential differences may then be measured directly using several other receiving electrodes. The receiving electrodes are typically arranged in an array or grid.

Induced polarization relies upon the fact that current injected into the ground causes some materials to become polarized. The phenomenon of polarizing the ground is often referred to as chargeability. The type and amount of chargeability associated with the ground may be measured by taking time domain and/or frequency domain measurements. In general, such measurements determine the degree to which the ground has been polarized by comparing a DC source signal transmitted to the ground with a measured decay signal after the source signal has been shut off. One or more physical properties of the ground may be correlated with the degree of polarization. Both induced polarization and resistivity measurements depend upon electrodes for transmitting and receiving electrical information.

One technique used to measure AC resistivity is to apply an AC current to conducting ground electrodes, and measure the corresponding voltage using other conducting electrodes. The electrodes can be metal stakes, or they can be "non-polarizing" electrodes. Another technique to measure AC resistivity is to inject AC current into the ground using non-contacting electrodes. This second technique is called capacitively-coupled resistivity (CCR), and is used in the OhmMapper™ product by OYO Corporation U.S.A., Geometrics Group, Inc. (e.g., see http://www.geometrics.com/OhmMapper/ohmmap.html). However, with the OhmMapper™ product, the magnitude of the apparent resistivity is measured, and computed (as with classical DC resistivity techniques) by dividing the magnitude of the measured voltage by the magnitude of the applied current. Shown in FIG. 6 is a representation of an Ohm-Mapper™ system utilizing a fixed dipole-dipole array adapted to be pulled over the surface of the ground. The system may be attached to a human's waist as represented by the circular belt B in FIG. 6. The Ohm-mapper system was operated at 16.5 kHz and provided an image of the resistivity as shown in the lower portion of FIG. 6.

Commercially available magnetic field sensors are also used to detect underground objects. It is noted that magnetic sensors are often called "electromagnetic" (or "EM") or "electromagnetic induction" (or "EMI") sensors, but this is a misnomer. They are more correctly termed "magnetic induction" (or "MI") sensors, because there is no significant (measurable) electric field that is applied or measured. In the prior art, what persons skilled in the art often refer to as "EM" sensors can be grouped into three categories: (1) EMI sensors that are AC magnetic sensors; (2) magnetic sensors that are DC magnetic, and (3) GPR sensors that rely on radio-frequency electromagnetic waves that operate in the megahertz and gigahertz ranges.

With EMI sensors, ferromagnetic objects have an in-phase response, whereas non-magnetic objects have an out-of-phase response (or signature). Thus, these sensors cannot detect the complex electrical resistivity. EMI sensors are sensing two material properties: the source and sensor use phase relationship to determine whether or not an object is ferromagnetic or nonferromagnetic. They cannot detect complex resistivity because the apparatus is not applying an electric current to the ground and detecting electric field, The EMI apparatus senses the magnetic field as opposed to the electric field.

As an example, it is noted that the Geophex GEM-2 and GEM-3, made by Geophex Ltd of Raleigh, N.C., work at various frequencies between 300 Hz and 96 kHz, and compute in-phase and quadrature images, but these devices are basically active magnetometers. As shown at http://www.geophex.com/GEM-2/Flyer/GEM2%20flyer2jpg.jpg, the flyer says that the "GEM-2 acts as an 'active magnetometer' at very low frequency, and thus can map the magnetic susceptibility". Arguably, the GEM-2 acts as an "active magnetometer" at all operating frequencies (300 Hz to 96 kHz, and even to 1 MHz and beyond). The GEM-2 has a transmitting coil (generating a quasi-static magnetic field) and a receiving coil (measuring a quasi-static magnetic field), so the method of generating the source signal, and of measuring the received signal is via magnetic induction. Even the highest operating frequency (96 kHz) has an electromagnetic wavelength of more than 3 km, and so this sensor always operates in the "near zone" (see Jackson, "Classical Electrodynamics" 3rd edition, Wiley, 1999, especially section 9.3). The Geophex GEM instruments do not measure complex resistivity (or complex conductivity), but rather complex (magnetic) susceptibility. Moreover, the differences in the response images at different frequencies are due to the fact that various materials in the ground do not have constant (complex) magnetic susceptibilities as a function of frequency.

Stolar Research of Raton, N. Mex., is currently working on a "semi-active electromagnetic induction" sensor; called the "DeltaEM gradiometer" (see http://www.stolarhorizon.com/DELTA_EM.htm). The receiving coil(s) is (are) basically the same as for other near-field magnetic induction sensors. However, this new sensor does not have the transmitter coil, but rather depends on RF transmitters (operating in the far zone) to generate the primary field. For example, it can use a high-power AM radio signal (operating at ~1 MHz) as the source field.

It is noted that both passive and semi-active "EM" sensors (as described above) can also detect the secondary magnetic fields associated with currents that have been induced in "good" conductors (such as metallic objects) by the primary magnetic field. In this case, they function in a manner similar to eddy current sensors, and they can be used to detect good conductors as well as objects with increased magnetic susceptibility. However, they cannot match the performance of active electric-field sensors (e.g., resistivity sensors) for detecting relatively subtle changes in the conductivity of common geophysical objects.

There exists a need for a method and apparatus that provides pairs of images that represent the real and imaginary components of the complex resistivity at some operating frequency (or as a function of many different frequencies). Furthermore, there is a need for a rapid and low-cost detection of relatively subtle changes in resistivity along extended stretches of roads, etc. None of the known prior-art sensors can do this. Prior art resistivity sensors do not operate satisfactorily.

SUMMARY OF THE INVENTION

The present invention utilizes, inter alia, stand-off capacity-coupled resistivity (CCR) sensing which permits surveys to be conducted at speeds of 10-20 mph or more, or an order of magnitude faster than with present CCR sensors. The present invention is adapted to use as source electrodes wires, flat plates, or steel belts, or sectors in a wheel-like structure enabling the sensor to be moved up and set down like a foot that is walking along the surface. An embodiment of the present invention dispenses with electrodes and utilizes a charged-particle beam or current injected into the ground along a plasma channel that is enabled with a high energy laser to inject current into the ground. In one embodiment of the present invention, the source electrodes are mounted on a separate vehicle or vehicles from the voltage sensor carrying vehicle or vehicles, traveling in front of and/or behind the sensor vehicle(s). and do not have to be physically connected to the voltage sensors.

Full-polarimetric resistivity sensing permits two resistivity images to be developed at any operating frequency. Frequency-dependent resistivity sensing is utilized whereby the sensing process is repeated at several different frequency steps. Alternatively, multiple different frequencies are combined into a single complex waveform, or a frequency sweep is performed. In any of these cases, the computed resistivity (or impeditivity) can be expressed as a function of frequency rather than a single (constant) number. These functions can function like fingerprints to more precisely map underground structures and anomalies.

The present invention incorporates change detection methodology that is used to detect underground activity of many kinds, including movement of unstable soils, movement of water, changes in water levels, percolation, and changes in temperature.

The present invention is applicable to levee monitoring, or looking for variations in the impeditivity spectra of soils (e.g., sand, clay, peat) in order to monitor water moving through or past weak portions of a levee. Similarly, this technique could be used to check for movement of water behind rock walls in mines or quarries that might serve as a signal of an impending catastrophe.

The present invention may be used to conduct rapid resistivity surveys prior to road construction or repairs. It may be desirable to survey an entire length of road with a relatively low-cost survey method based on this invention, and only perform fixed-site resistivity surveys on suspected problem areas. In this way, latent problems can be identified before road hazards develop.

The present invention may also be used to conduct rapid site surveys prior to development. For example, a builder may wish to survey an entire plot of land to see if any large sinkholes exist prior to purchasing the land or beginning development. Again, a relatively rapid and low-cost means of mapping the geological structure would be tremendously beneficial in this case.

For many of these kinds of applications, change detection technology can also be used. This is a well-known technique commonly employed to look for differences in visible or IR images related to (for example) fires or development. Since the processed complex resistivity data is also an image, it can be compared to similar images taken at previous times to look for settling, shifts, and/or other sorts of underground activity. Change detection could also be employed with the CCR imaging described in this disclosure to determine underground water activity after a heavy rain, seasonal variations in the water table, movement of underground hydrocarbon plumes, and similar functions. It is also well-known that resistivity is correlated with temperature, so changes in underground temperatures (such as might be associated with global warming) can be detected.

In addition, it is noted that there are many similar applications of a military nature for which this invention could be applied. Some of the most obvious include border patrol activity. It is easy to detect the high resistivity associated with voids, especially when this is combined with change detection. In this way, it is possible to monitor clandestine tunneling activity along national borders, around perimeters of prisons, etc. simply by periodically driving along the border/perimeter (and this is typically done as part of normal security operations).

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

FIG. 1B is a graphical representation of the sensor circuitry of one embodiment of the present invention FIG. 1C is a graphical illustration of a pole-gradiometer electrode configuration of one embodiment of the present invention.

FIG. 1D is a graphical illustration of an alternative pole-gradiometer electrode configuration of one embodiment of the present invention.

FIG. 1E is a graphical illustration of a source electrode of an embodiment of the present invention.

FIG. 1F is a graphical illustration of a sensor electrode of an embodiment of the present invention FIG. 2 is a graphical representation of examples of electrode arrays that may be used to practice the present invention.

FIG. 8 is a graphical presentation of the electrode simulations illustrating the effects of undesirable charges for various electrode configurations at various electrode heights.

FIG. 8A is a graphical depiction of a vehicle and trailer configuration of an embodiment of the present invention showing the raising and lowering of the sensor platform structure.

FIG. 9 is a graphical depiction of a vehicle and trailer configuration of an embodiment of the present invention showing the basic electrode configurations of dipole-dipole, pole-dipole and pole-gradiometer.

FIG. 10 is an illustration of static and electromagnetic fields.

FIG. 11 is an illustration of various types of E-field sensors.

DESCRIPTION OF THE PREFERRED EMBODIMENTS

Having described the principles of the invention, the following exemplary embodiments are given to illustrate specific applications of the invention including the best mode now known to the inventors.

By way of background, by measuring electrical resistance, electrical resistivity can be determined by mathematical formulas. In general, resistivity of soil samples can be measured using a soil test box such as those available from MC Miller Co. When using a soil test box to obtain the resistivity from the resistance measurement, the cross-sectional area is divided by the length. Table 1 shows resistivities for many common substances.

TABLE 1

RESISTIVITY MEASUREMENTS FOR VARIOUS SUBSTANCES

| Material | Resistivity $\rho$ ($\Omega$-m) |
| --- | --- |
| Salt (sea) water | 0.1-1.0 |
| Fresh water | 3-100 |
| Pellegrino (bottled water) | 6.9 |
| Ultra-pure water @ 25 degrees C. | 182K |
| Drill mud, hydraul-EZ | 4.5 |
| Clay (>10% moisture) | 1-100 |
| Loam (>10% moisture) | 1-200 |
| Aluvium | 1-1000 |
| Sand and gravel (dry) | 50-10 k |
| Limestone | 100-10 k |
| Igneous rock (competent) | 100-1M |

Materials can be described as being conductors when the conduction current is much larger than the displacement current, and they can be described as dielectrics when the opposite is true. Materials can be classified as "quasi-conductors" when neither the conduction current nor the displacement current dominates (Kraus, Electromagnetics, 4th Ed, McGraw-Hill, 1992).

The mathematical formulas are as follows (where K=A/l and

Resistivity=Electric field intensity/Electric current density and

Resistivity=1/conductivity):

Resistance: R=V/I (Ω)

Resistivity:

$$\rho = RK(\Omega - m)$$

$$\rho = \left(\frac{V}{I}\right)\left(\frac{wh}{l}\right) = R\frac{A}{l}$$

$$\rho = \left(\frac{V}{I}\right)\left(\frac{wh}{l}\right) = \frac{E}{J}$$

$$\rho = \frac{1}{\sigma}$$

Figure 3:
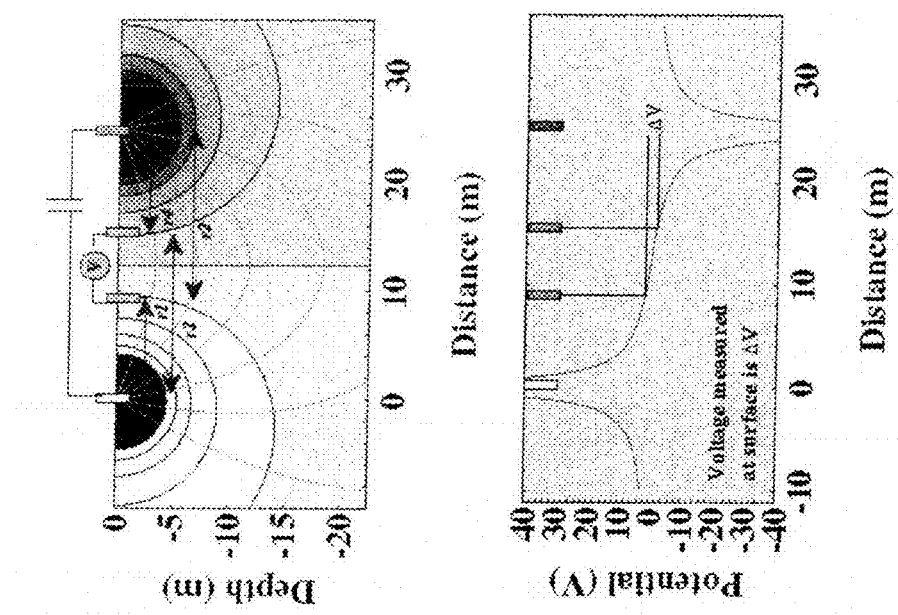
FIG. 3 is an illustration showing the measurement of the resistivity of an infinite half-space of soil. The upper graphic shows the electric-flux lines when current is injected into the ground, and the lower graphic shows the voltage gradient that is measured.

If the ground being measured is homogeneous, then: $\rho=\rho_a$ For a 4-pin measurement as shown in FIG. 3:

$$\rho_a = RK = \left(\frac{\Delta V}{I}\right)\left(\frac{2\pi}{\frac{1}{r_1} - \frac{1}{r_2} - \frac{1}{r_3} + \frac{1}{r_4}}\right)$$

Figure 1:
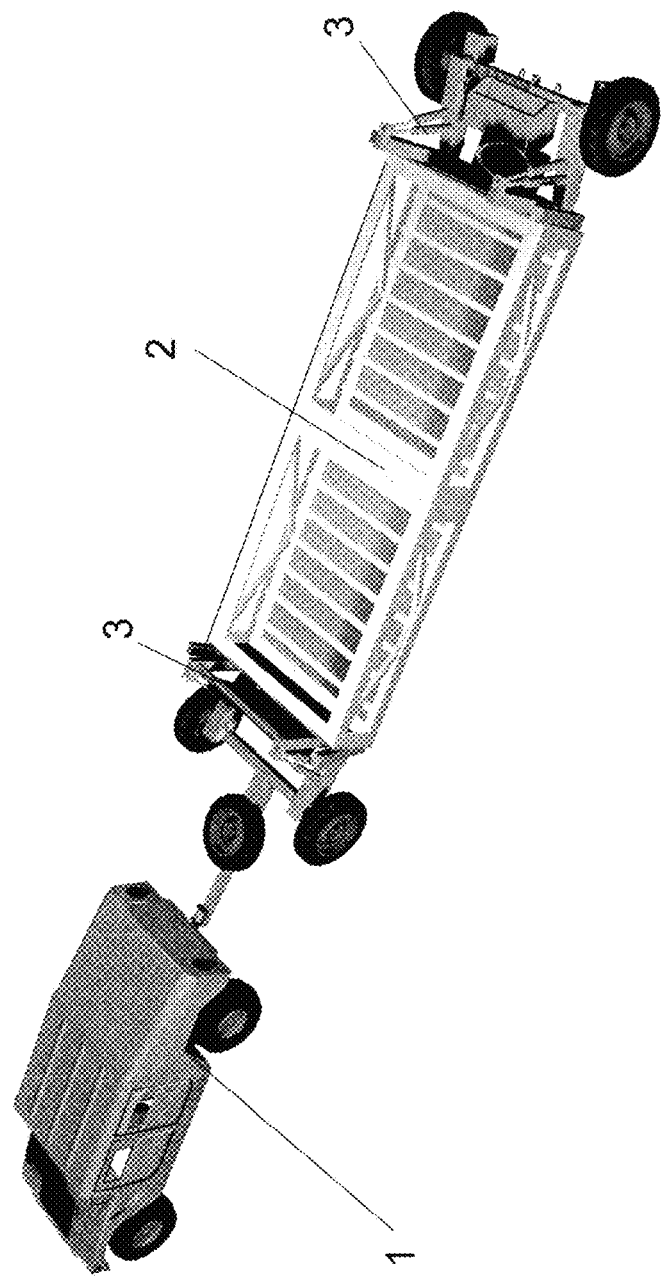
FIG. 1 is a graphical representation of one embodiment of the present invention.
Figure 1A:
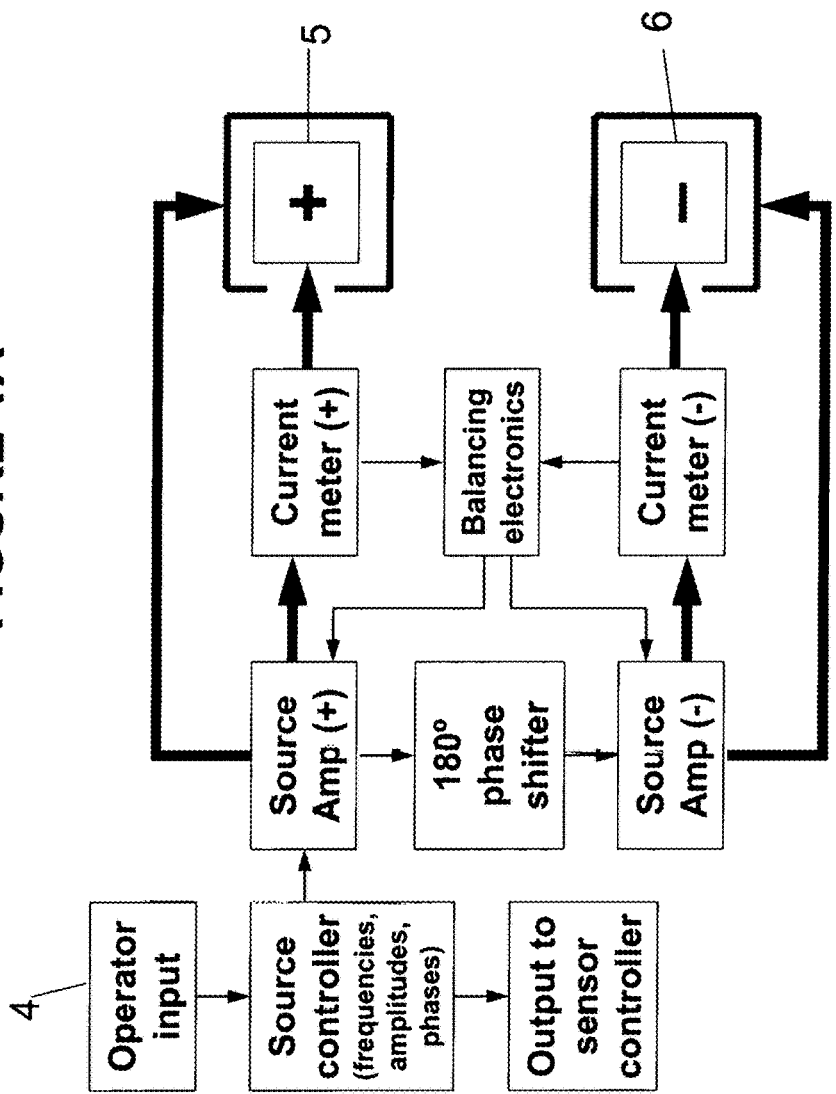
FIG. 1A is a graphical representation of the source circuitry of one embodiment of the present invention.

FIG. 1A is a block diagram of one embodiment of the source electronics in accordance with the principles of the present invention. In this block diagram, the heavy black arrows represent the high-voltage current, whereas the light lines represent the control signals. Block 4 represents the input circuitry which is operatively connected to an electrical power source or generator depending upon the operational environment as is well known to those of ordinary skill in the art. Blocks 5 and 6 represent the output circuitry through which current is induced into the ground.

FIG. 1B is a block diagram of one embodiment of the sensor electronics in accordance with the present invention. In this embodiment, voltage-following sensors are employed. A pair of potential sensors is used, and a potential difference is calculated using a difference amplifier. The nulling electronics cancel the drive current to the voltage sensors (and to the ground), so that the sensor electrodes are at the potential of the ground. Consequently, the voltages sensed by components V1 and V2 (as represented by blocks 8 and 9) are the potentials being measured that reflects the differences attributable to soil or ground content. The components V1 and V2 may be implemented by an array of sensors electrodes described further herein. The voltage potentials are thereafter processed by a processor 7 (or computer; not shown) to determine the resistance and resistivity in order to identify and/or map the composition of the ground With regard to alternate methods for source electrodes in the preferred embodiments (including UNCLAS source of CPB or HEL), the electrical source electrodes 5 and 6 are electrically-conducting plates that are driven at moderately high voltages (typically hundreds or thousands of volts) at frequencies from approximately 1 kHz to approximately 1 MHz. In one preferred embodiment, the sensor electrodes 8 and 9 are similarly-sized conducting plates that are connected to sensor electronics to detect the free-space potential (at the electrode location) or preferably the ground potential (directly below the electrode location). In the latter case, the sensor electrodes are driven at a potential required to null out the measured E-field; this feedback potential is the ground potential. This kind of electric potential sensor is called a stand-off voltage sensor or a voltage-following sensor.

The source electrodes 5 and 6 are capacitively-coupled to the ground, and are of a size and spacing (above the ground) that the capacitive coupling is on the order of approximately 10 pF to approximately 100 pF. The source plate could be flat, or shaped so as to minimize field enhancements that could lead to premature corona, streamers, and/or electrostatic discharge (ESD). The source could also be constructed of wires, or a screen mesh, or other geometries to facilitate assembly, cleaning, etc. The source could consist of wires or chains that would be suspended such that they would capacitively couple to the ground more effectively. Similarly, the source could even consist of electrodes embedded in a skid plate made of some dielectric material (e.g., nylon or Teflon). In addition to a guard to minimize or eliminate the source-to-platform coupling, additional source electrode elements 5 and 6 could be employed as an electrostatic lens to better focus the induced current on the ground.

There exist other known methods and apparatus for coupling current into the ground, and such methods and apparatus can be utilized as readily understood by those of ordinary skill in the art in accordance with the principles of this invention. For example, AC currents could be injected into the ground using charged particle beams (CPB) not unlike those used in some modern laser printers, or via a conducting channel caused by radioactive source or a plasma channel caused by a high-energy laser (HEL). References showing such alternative methods and apparatus include: http://en.wikipedia.org/wiki/Charged_particle_beam, http://en.wikipedia.org/wiki/Laser-Induced_Plasma_Channel, United States Patent application No. 2008/0215260, and U.S. Pat. No. 7,223,983 (2007). All of these references are hereby incorporated by reference as though fully rewritten herein.

FIGS. 1C and 1D are graphical representations of the source and sensor electrodes mounted on a platform 10 movably supported by wheels 11. The embodiment of FIGS. 1C and 1D further includes mechanical or hydraulic adjusters to adjust the platform height as are well known to those of ordinary skill in the art, but not shown. The platform 10 supports "+" and "−" source electrodes (5 and 6, respectively). In a "pole-gradiometer" configuration, the "+" electrode 5 is the "pole", and the "−" electrode 6 is the "infinity electrode". Two configurations are shown: FIG. 1C illustrates an embodiment with the infinity electrode 6 on the top of the platform. FIG. 1D illustrates an embodiment with the infinity electrode 6 split on the bottom. The source electrodes 5 and 6 are typically driven at a high voltage (on the order of 1 kV), and at an AC frequency (~1 kHz to ~1 MHz), 180° out of phase.

The guards ("G+" and "G−") are driven at the same potential as the source electrodes ("+" and "−"). The guards are adjusted (physically up and down, relative to the source electrodes) until all quasi-static electric flux lines (i.e., the AC source current) goes from the source electrodes to the ground, and all quasi-static flux lines from the guards (i.e., the AC guard current) goes from the guards to the sensor platform. The platform 10, as shown in FIGS. 1C and 1D, also supports sensor electrodes 8, 9 ("V1" and "V2", respectively). The electrodes 8 and 9 are designed to sense the electric potential of the ground under them. These sensor electrodes 8 and 9 have shields ("S1" and "S2") that are designed to capture the unwanted flux lines from the nearby platform and source electrodes 5, 6, and are adjustable (up and down, relative to the sensor electrodes) so that all unwanted electric flux goes to the shields.

FIG. 1E is a diagrammatic illustration of a source electrode of a preferred embodiment of the present invention. FIG. 1E shows the source electrode flux lines. Since the guard is at the same potential as the source electrode, there is no electric field between them; hence, no flux lines. In the configuration shown, the guard has been adjusted so that all flux lines from the guard terminate on the sensor platform, and all flux lines from the source terminate on the ground. In this way, the source current can be measured and is known to be the same current that is injected into the ground. Relevant considerations include, firstly, it is desirable to have a stand-off, capacitively-coupled source to inject current without contact with the ground. Secondly, the source should operate efficiently at multiple freq. (1 kHz-1 MHz). Thirdly, the source should not be sensitive to vehicle (platform) bounce (0.1 Hz-100 Hz). Issue #1: need stand-off, capacitively-coupled sensor to detect voltages without contact FIG. 1F is a diagrammatic illustration of a sensor electrode of a preferred embodiment of the present invention. FIG. 1F shows the flux lines associated with a voltage-following sensor electrode. The potential on the electrode is adjusted (via a feedback loop) until no electric field is measured; this is shown in the diagram as no flux lines between the sensor and the ground. The shield is driven at the same potential as the sensor, so there is also no electric field (and no flux lines) between the sensor and the shield. The shield captures all of the flux lines from the sensor platform due to the capacitance between the sensor and the platform. In this way, the feedback potential of the sensor electrode is the ground potential. Relevant considerations include: (1) prefer stand-off, capacitively-coupled sensor to detect voltages without contact; (2) sensor should detect ground voltages at source frequencies (1 kHz-1 MHz); (3) sensor should not be sensitive to vehicle (platform) bounce (0.1 Hz-100 Hz); and (4) sensor should be insensitive to source electrodes or other sensor electrodes.

FIG. 2 is a graphical representation of examples of electrode arrays that may be used to practice the present invention.

FIG. 3 is an illustration showing the measurement of the resistivity of an infinite half-space of soil. The detection apparatus shown in FIG. 3 utilizes a resistivity sensor connected to four points on the surface and uses a geometric factor to compute the resistivity.

As shown in FIG. 3, the upper graphic shows the electric-flux lines when current is injected into the ground, and the lower graphic shows the voltage gradient that is measured. These graphics assume a uniform resistivity.

When the half-space is not uniform, complications may arise. In that case, the measured resistivity is a weighted average of the resistivity of all the different materials in the half-space. In order to map out the resistivity of such materials, one has to take many measurements with the electrodes at slightly different positions, and then perform a mathematical inversion of the data. In the past, such measurements and computations required a great deal of time and effort in order to conduct a simple study.

Figure 4:
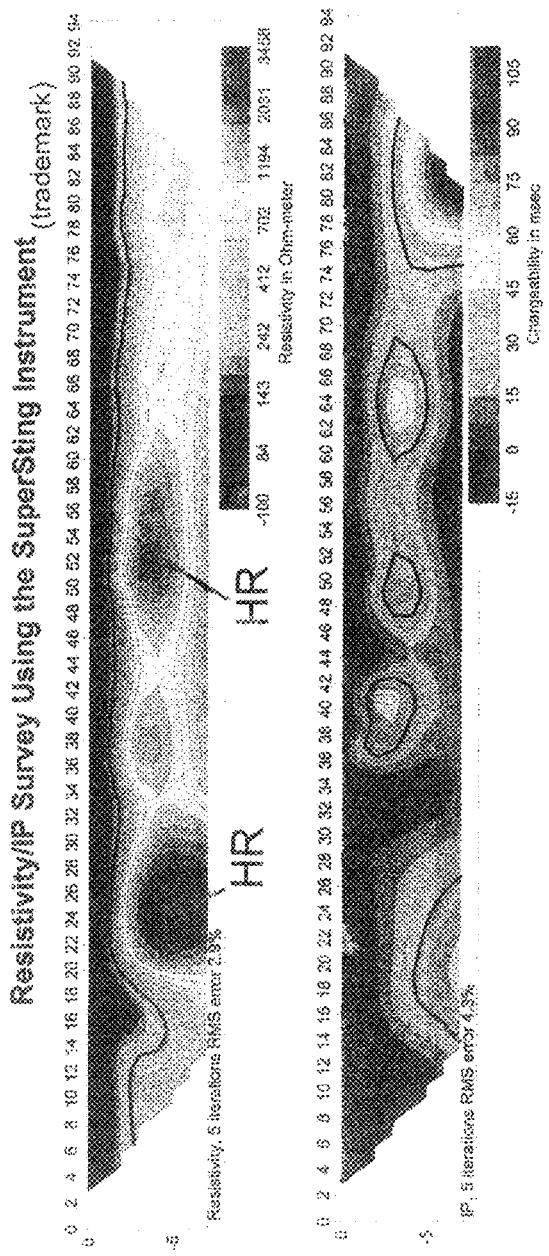
FIG. 4 is graphical illustration showing resistivity (upper) and induced polarization (IP) (or chargeability) (lower) results utilizing a SuperSting™ Instrument.

FIG. 4 is an example of an inverted resistivity image. Using modern personal computers, the time to process data retrieved from the measurements taken in FIG. 3 has been reduced from minutes and hours to seconds.

FIG. 4 illustrates two resistivity images taken with a commercial resistivity sensor manufactured by AGI in Austin, Tex. These 2-D images show the resistivity of a vertical slice of soil. Regions (blobs) of high resistivity are marked HR. This data was obtained without any drilling or digging. A linear array of electrodes—basically tent stakes—was all that was needed. A processor built into the resistivity meter completed all the data gathering, and the inversions were quickly done on a laptop PC.

This kind of electrical resistivity sensing technology is built into several different commercial geophysical sensors that have been on the market for the past few years. Such sensors are used to find seams in rock when drilling for water and to document sinkholes. Such sensors are used to map the boundaries of gypsum or sulfide deposits in mining operations, and to find freshwater-saltwater boundaries in marine estuaries, or hydrocarbon plumes in environmental remediation sites. There are also related military applications.

Commercially available sensors and inversion software such as the Ohm-Mapper map image objects and structures that are buried underground. Images can be obtained in highly conductive soil, even under seawater. Generally speaking, the resolution of these images is limited by the electrode spacing, and the depth of the images is limited by the array length. Consequently, such sensors are not fundamentally limited by the conductivity of the soil like SAR and GPR sensors are. Such sensors are not fundamentally limited by the resistivity of targets, like EMI sensors are. Practical limitations include the cost of large numbers of electrodes, the setup time, the data collection time, and the inversion time.

The "rules of thumb" for prior art resistivity imaging include: (1) DC resistivity and Induced Polarization (IP) are complementary; (2) 1-D, 2-D, 3-D, time-lapse imaging is possible (2-D shown in FIG. 4; (3) the useful sensing depth is approximately 20% of array length (dipole-dipole); (4) the useful resolution ~50% of electrode spacing (dipole-dipole); and the trade-offs/variables include object size, resistivity difference, and depth. Generally speaking, the distance from dipole to dipole is roughly twenty percent of the penetration distance. For example, if the length of the electrode array is ten feet, the length of the electric field will detect objects up to two feet underground.

Figure 5:
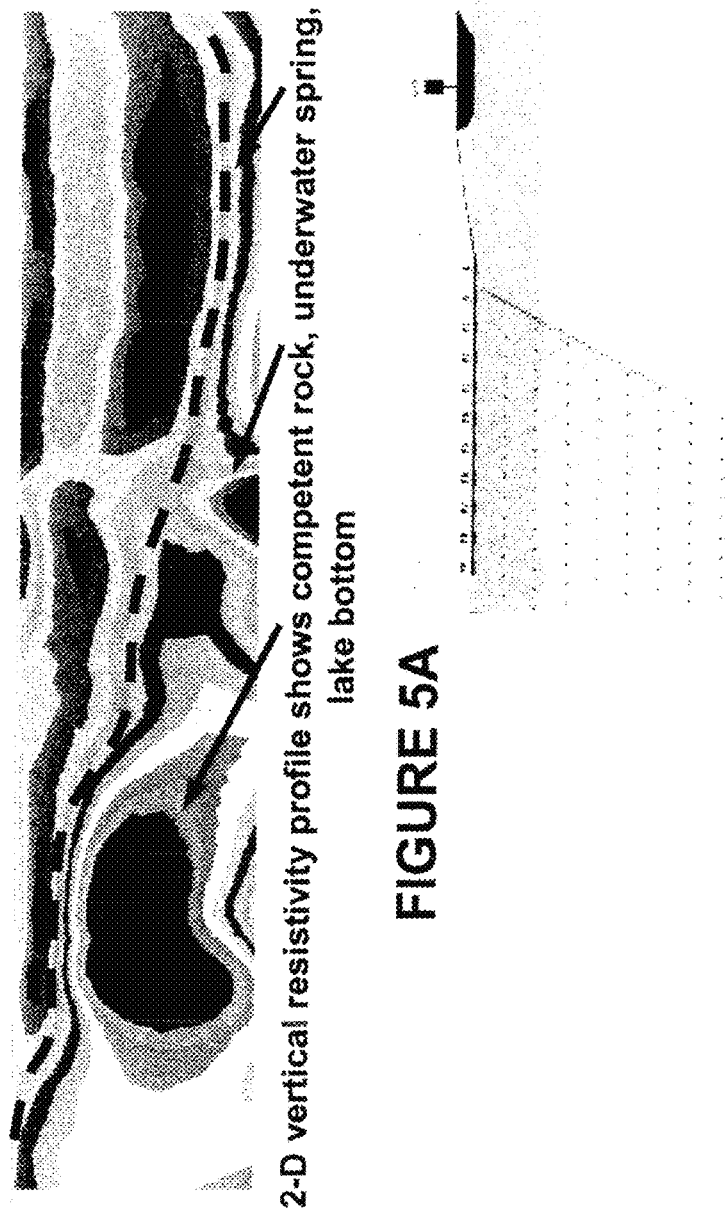
FIG. 5A is a graphical two dimensional image of a resistivity profile revealing rock formation and an underwater spring.
FIG. 5B is a schematic representation of an electrode array being towed behind a boat.

FIG. 5B is a depiction of a prior art usage in a water environment of a modified version of the AGI™ sensor being towed behind a boat to map out not only the depth of the water, but also the structure of the soil under the water. The stainless steel "tent stakes" used for ground-based measurements are replaced with graphite electrodes, and the software has been modified so that the inversion can be performed incrementally on a very large dataset.

FIG. 1 is an embodiment of the present invention showing a vehicle 1 towing a wheeled trailer having an adjustable platform 2. Adjustments are made through hydraulic or mechanical adjusters 3. The sensor platform may be an aluminum frame, approximately eight feet wide and ten feet long. A double platform configuration is shown, which is approximately eight feet wide and twenty feet long. Adjustments can be made to provide greater or lesser distance between the surface of the road and the sensor depending upon the road conditions. It is also desirable to negate the effect of road variations (bounce) or terrain conditions that affect the readings of the sensors. In accordance with the present invention, electrodes are built that not only cancel the effects of the platform bounce, but do so over more than 10 cm (4") of platform bounce. Better results are obtained when the probes are closer to the ground, however, there is a trade-off since terrain conditions may prevent operation in proximity to the ground.

As described herein, the present inventive system and method incorporates technological improvements by which the technology becomes useful for some entirely new applications; like periodic road monitoring, levee monitoring, and border monitoring.

Table 1 shows the resistivities of water, soils and rocks, which vary by more than six orders of magnitude. Voids and many man-made objects have resistivities that fall outside this range. But even with all that dynamic range, common ground materials aren't particularly good conductors and they aren't good insulators. This creates a problem for some traditional sensors, such as radar and electromagnetic induction sensors; and a need to examine new sensor technology that can exploit those material properties.

Figure 7:
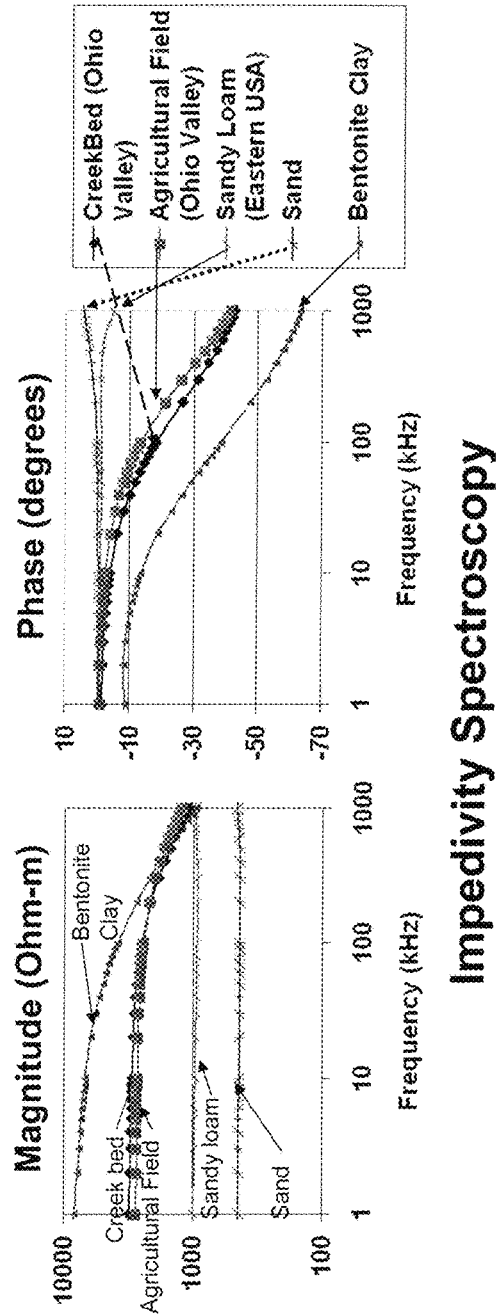
FIG. 7 is a graphical depiction of the impedivity (or complex resistivity) spectroscopy (over a frequency range of 1-1000 kHz) of various soils such as clay, sandy loam, sand, creek bed and agricultural field.

FIG. 7 is a graphical depiction of the complex resistivity (known herein as impedivity) over the frequency range from about 1 kHz to about 1 MHz. As represented in FIG. 7, at this frequency range many soils, rocks, and water change their fundamental character—at lower frequencies, the in-phase conduction currents dominate, and at higher frequencies, the displacement currents dominate. The process of making measurements of complex resistivity over this frequency band of interest is referred to herein as "impedivity spectroscopy". The present invention incorporates features that enable making these measurements faster, better, and cheaper.

The advantage of impedivity spectroscopy vs. conventional resistivity imaging is similar to the advantages of hyper-spectral vs. conventional IR imaging. Many different views of the same targets are obtained; this provides a very powerful technique to detect and classify a broader spectrum of targets.

FIG. 8 is a graph illustrating the results of an electrode study conducted showing the sensitivity of a sensor to variations in platform height, due to vertical movement of the platform (bounce up and down) as it is driven down the road. It is desirable that the sensors do not respond to that bounce.

As illustrated in FIG. 8A, the sensor platform is constructed in accordance with one embodiment of the present invention is based on a type-classified "dolly set" or "mobilizer" that is normally used to convert a standard Army shelter into a four-wheeled trailer. The adjustment mechanism operates to continuously adjust the height of the bottom of the sensor platform from ground level up to about 18".

Turning now to the characteristics of materials, the frequency at which the conduction current equals the displacement current is referred to as the "quasi-conducting frequency". At true "DC" (i.e. zero Hertz), all materials are conducting and there is no such thing as complex resistivity. However, most materials that are considered good insulators have quasi-conducting frequencies on the order of milli-Hertz or micro-Hertz and the charge relaxation time may be hours or even days. Conversely, most materials that are considered good conductors have quasi-conducting frequencies that are virtually infinite (higher than THz).

Of particular interest is that the quasi-conducting frequencies of most rocks, clays, and other common ground materials range between 1 kHz and 1 MHz. Therefore, if both the in-phase and quadrature components of the measured voltage are recorded at an (AC) operating frequency in this range, where the phase is measured relative to an applied (AC) current, then both the real and imaginary components of the complex apparent resistivity can be estimated. This provides two new images that complement classic (DC) resistivity images. Moreover, if this complex resistivity is calculated at several different operating frequencies, then additional frequency-dependent material properties can be detected and utilized.

Since many common ground materials are also quasi-conductors (where the conduction currents are on the order of the displacement currents) at frequencies between 1 kHz and 1 MHz, then any ground currents will similarly have an in-phase and quadrature components (relative to the applied voltage). If an analysis is done at multiple frequencies, then in-phase and quadrature images can be developed that can show these differences in complex conductivities. The present invention incorporates these concepts which are not utilized in current state-of-the-art instruments.

The capacitively coupled resistivity (CCR) design approach eliminates the need for electrodes with direct (ohmic) contact with the ground (as with the AGI SuperSting).

Moreover, higher-frequency capacitive coupling allows for resistivity sensors with reasonably-sized electrodes that do not even need to be in physical contact with the ground, or even dragged along the ground (as with the Geometrics OhmMapper). Such sensors currently operate at 1 to 2 MPH, but in accordance with the principles of the present invention can be configured to operate on vehicles at previously unheard-of speeds of approximately 5 to 20 mph (with the possibility of higher speeds).

The CCR sensors of one embodiment of the present invention can be classified as "active" E-field sensors because they apply an electric signal (specifically, an AC current) and measure the corresponding electric response (specifically, one or more voltages). The CCR sensors of one embodiment of the present invention are "quasi-static" because they operate in the "near zone", using (non-DC) frequencies with electromagnetic wavelengths that are much larger than any operating distances. CCR sensors complement; that is, measure a different material property as compared to similar quasi-static active magnetic sensors. These magnetic sensors measure susceptibility (a magnetic property) by measuring the distortions in a magnetic field. It is noted that while most materials with high susceptibility are good conductors (e.g., iron, nickel, and cobalt), many excellent electrical conductors (e.g., copper, aluminum, silver) have virtually no measurable magnetic properties. Similarly, air (e.g., voids in the ground) have the same magnetic susceptibility as most rocks, soils, water, and other common ground materials, yet the electric conductivity of air is orders of magnitude lower than for these other materials. This is one reason magnetometers are good for UXO detection. But this is also why magnetic sensors are not good for detecting sinkholes, caves, tunnels, electrical wires, plastics, water, etc. "Resistivity methods" can differentiate these kinds of materials because they exploit the electrical, not the magnetic, properties of these materials.

The present invention can be implemented in many possible embodiments for a CCR sensor involving one or more "transmitter" or "source" electrodes to capacitively-couple current into the ground. The current that is coupled between the source electrodes and the ground is proportional to the capacitance, the electrode voltage, and the operating frequency. The capacitance is in turn proportional to the physical size of the electrode (bigger is preferable), and is inversely proportional to the spacing between the electrode and the conducting layers of the ground (closer is preferable). However the electrodes preferably have several inches of ground clearance, just like the undercarriage, so there is a limit on how close the electrodes can be positioned relative to the ground. Also, the conductivity of surface layers; the road and/or dry soils may be too resistive to conduct much current, so the effective capacitance may be between the electrode (several inches above the surface) and the conducting layers of the ground (several inches below the surface). Also, there is a practical limit to the size of the source electrode(s) as they become unwieldy if they exceed the dimensions of the vehicle. Large electrodes limit spatial resolution. Spacing should be larger than the electrode size.

The operating voltage can be moderately high (up to 1-5 kV). At higher voltages, unwanted discharging currents due to corona, streamers, and ESD may present unwanted side effects. Furthermore, higher voltages present greater safety issues.

In accordance with the principles of present invention, the operating frequency may be in a range up to 1 MHz or more for most applications. Some frequencies in this band have strong interfering sources such as AM radio stations (although these could be used as alternate sources in a semi-active sensor). At frequencies above 1 MHz, the electromagnetic wavelength is less than 300 m, whereby near-zone assumptions begin to fail. However, for some applications (with shorter operating distances), quasi-static operation at frequencies even as high as 30-60 MHz may be possible. The primary advantage of higher operating frequencies is greater induced ground currents (for the same capacitance and voltage). One potential disadvantage is that more and more materials start behaving like dielectrics at higher frequencies, and so the ground conductivity may not be sufficient to support high-quality, low-noise measurements. Also, EMI starts to become a greater issue at these higher frequencies. At even higher frequencies, e.g. 300-3,000 MHz, the full electromagnetic wave can be used. This is done with ground penetrating radar (GPR), which is a different approach. Radar generating or transmitting waves depend upon reflections from objects of interest.

In accordance with the principles of the present invention, a quasi-static electric field appears at any point in time; similar to a "freeze frame." The field being observed correlates to a voltage reading. Because of the wavelength being used by the present invention, it is quasi static as opposed to radar where at higher frequencies the quasi static measurements are no longer applicable.

With respect to the operating parameters of one embodiment of the present invention, using the equation $I=dq/dt=C\ dV/dt=C\ V\ 2\ pi\ f$; then if $C=100$ pF, $V=1$ kV, and $f=1$ MHz, the induced current is ~0.6 A, which is on the order of the same ground current supplied by the AGI SuperSting. Measurements with less current are always possible, but the signal to noise ratio (SNR) drops. Fortunately, the 1/f noise that can dominate VLF/ELF/ULF measurements decreases with frequency, so that excellent measurements may be attained at 1 MHz, and good measurements can be made even down to 1 kHz.

The noise may be decreased by integrating over more time, but at some point, this slows the measurement process down, so time limits this method.

In accordance with the present invention, the source electrodes can be flat plates mounted under the bottom or on the sides of the vehicle (depending on the application). The source electrodes can also be wires (or groups of wires); making the electrodes lighter and easier to maintain. The source electrodes can be spheres or cylinders or cylinders with rounded ends, provided that reasonable capacitance (10 to ~100 pF or so) is obtained. Smaller electrodes would be on the order of 10 pico farads.

Figure 6:
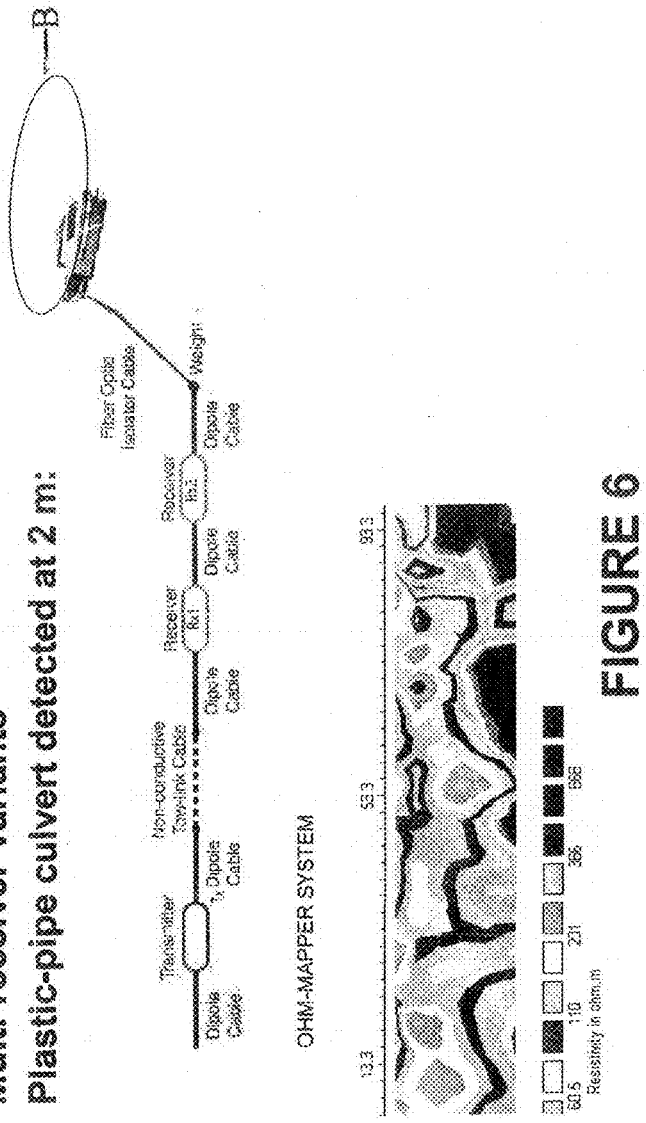
FIG. 6 is a representation of an Ohm-Mapper™ system utilizing a fixed dipole-dipole array adapted to be pulled over the surface of the ground.

Moreover, the source electrodes can be mounted like parts of a wheel, steel belts in the tires, or even a sector of a belt; so the sensor would be picked up and set down, resembling the effect of "walking" along the road. The source electrodes may also comprise a chain-like structure which drags along the ground or a cable-like structure as shown in FIG. 6.

The source electrodes don't have to be mounted on the sensor vehicle, and can be positioned on a separate vehicle, or on a trailer.

In the alternative, the source electrodes could be replaced altogether with a charged-particle beam or using a conductive plasma path generated with a high energy field that would directly inject current into the ground.

The purpose of the receiver (or sensor) electrodes is to measure the voltage on the ground without contacting the ground. Accordingly, very sensitive air electrodes must be used, such as those recently developed by Quasar. Such electrodes detect the voltage on the surface of the ground (or in the conducting layer of the ground below the surface). Because the sensing is done at frequencies of 1 kHz to 1 MHz (typically), a small capacitance (~1 pF) may be sufficient to detect a small voltage differential (~mV) with low noise.

The coupling between the electrodes can be enhanced by increasing the conductivity of the air, for example, with a radioactive source. This was done in U.S. Pat. No. 4,199,715 to Maynard Hill involving an electrostatic autopilot, hereby incorporated by reference. However this is probably not needed for the higher operating frequencies (1 kHz to 1 MHz, and potentially more), and the electronics in the Quasar sensors are considerably better than what was available at the time of the Hill patent in 1980.

Once current has been injected (with the source electrodes or apparatus) and voltage has been measured (with the high-performance air E-field sensors), then the equivalent to the normal resistivity imaging may be conducted for the rest of the CCR process imaging. However, since the operation is conducted at some frequency, in-phase and quadrature measurements can be conducted, and this can be done at several frequencies (or even at all frequencies if we want to use impulses or "white noise" as our source).

For example, operation is conducted at a few (plurality) of frequencies, and in general, the complex resistivity of typical materials in geophysical structures changes over the operating band of interest (typically 1 kHz-1 MHz), so that these "hyper-spectral" signatures as unique "fingerprints" that allow significantly more degrees of freedom for detecting geophysical structures or other underground anomalies of interest.

According to the principles of the present invention, the "full polarization" measurements are combined with capacitively-coupled AC resistivity measurements and DC inversion techniques.

The invention claimed is:

1. A method of measuring the complex resistivity of underground materials using capacitively-coupled resistivity (CCR) sensing over the frequency range from about 1 kHz to about 1 MHz comprising:
    positioning at least one source element in proximity to the ground to capacitively induce current into the ground at a predetermined frequency in the range of about 1 kHz to about 1 MHz;
    positioning at least one sensor in proximity to the ground to capacitively receive current from the ground;
    receiving the current transmitted through at least a portion of the ground at the at least one sensor;
    making measurements of complex resistivity at the predetermined frequency; and processing the complex resistivity based upon the measurements taken to determine the ground content.

2. The method of claim 1 further comprising displaying the results of the complex resistivity results.

3. The method of claim 1 further comprising providing current into the ground at more than one frequency within the frequency range of about 1 kHz to 1 MHz.

4. The method of claim 1 wherein at least one of the source element or sensor is mounted on a movable platform.

5. The method of claim 4, wherein the movable platform is mounted on a trailer pulled by a vehicle and is adjustable for ground clearance, and further comprises a guard positioned between the source and the ground, wherein guard is driven at the same potential as the at least one source and the at least one sensor such that there is substantially no electric field between them so that the effects of the vertical movement of the platform due to undesirable ground surface conditions are negated when measuring the complex resistivity.

6. The method of claim 1 wherein an impedivity spectroscopy of the ground is taken only in frequency range of 1 kHz to 1 MHz.

7. The method of claim 1 wherein the source element and sensor comprise a dipole-dipole configuration.

8. The method of claim 7 wherein the induced current penetrates into the ground to a depth of substantially one fifth the distance of the dipole-dipole configuration.

9. The method of claim 1 wherein the source element and sensor comprise a pole-potential gradient configuration.

10. The method of claim 1 wherein the current is injected into the ground along a plasma channel that is enabled with a high energy laser.

11. The method of claim 1 wherein the induced current is generated by the at least one source with an operating voltage that is in the range of one to five kV.

12. A system for measuring the complex resistivity and providing a representational image of a portion of the ground comprising:
   a current generator for generating alternating current at a frequency within the frequency range of about 1 kHz to about 1 MHz;
   at least one source member operatively connected to the current generator for inducing the generated electric current into the ground;
   at least one sensor for sensing the electrical potential of the electric field in the ground created by the electric current;
   a receiver for receiving the measurements of the electrical potential of the ground;
   a processor for calculating the complex resistivity and creating a representative display of ground content based upon the complex resistivity; and
   a display operatively connected to the processor for mapping the portion of the ground in which current was induced.

13. The system of claim 12 wherein the at least one source member and at least one sensor are configured in an array, and the depth of the ground being displayed is one fifth of the distance across the array.

14. The system of claim 12, wherein the at least one source member and the at least one sensor are arranged in a Wenner alpha array, a Wenner beta array, a Wenner gamma array, a pole-pole array, a dipole-dipole array, a pole-dipole array, a Wenner array, a Schlumberger array, an equatorial dipole-dipole array, or any combination thereof.

15. The system of claim 14, further comprising software configured to render a map of the ground from the electrical potential recorded by the processor for calculating the complex resistivity.

16. A method of determining the location of underground materials and/or objects comprising:
   delivering an alternating current to the ground through a source element configured to induce current into the ground in a non-contacting manner;
   measuring an electrical potential associated with the current with at least one sensor in a non-contacting manner;
   recording the electrical potential with a resistivity meter coupled to the at least one sensor electrode to thereby determine the complex resistivity; and
   rendering a map of the ground from the electrical potential recorded by the resistivity meter.

17. The method of claim 16 wherein a charged-particle beam is used to inject current into the ground.

18. The method of claim 16 wherein current is injected into the ground along a plasma channel that is enabled with a high energy laser.

19. The method of claim 16 further comprising a current generator for generating an electrical current at a predetermined frequency equal to or greater 1 kHz and a processor for processing the received measurements of the electromagnetic field induced into at least a portion of the ground through at the at least one sensor and processing the complex resistivity based upon the measurements taken to determine the ground content.

* * * * *